(12) United States Patent
Miyata

(10) Patent No.: US 7,252,610 B2
(45) Date of Patent: Aug. 7, 2007

(54) AUTOMOTIVE ENGINE ACCESSORY DRIVE SYSTEM

(75) Inventor: Hirofumi Miyata, Hyogo (JP)

(73) Assignee: Bando Chemical Industries, Ltd., Kobe-shi (JP)

( * ) Notice: Subject to any disclaimer, the term of this patent is extended or adjusted under 35 U.S.C. 154(b) by 572 days.

(21) Appl. No.: 10/857,849

(22) Filed: Jun. 2, 2004

(65) Prior Publication Data

US 2005/0003916 A1    Jan. 6, 2005

(30) Foreign Application Priority Data

Jul. 3, 2003    (JP) .............................. 2003-270728

(51) Int. Cl.
 *F02B 67/06* (2006.01)
 *F16H 7/22* (2006.01)
(52) U.S. Cl. ...................... 474/122; 474/101; 474/108; 123/90.31
(58) Field of Classification Search ................ 474/101, 474/109, 70, 148, 72, 108, 122, 125; 123/90.15, 123/90.31, 90.32, 55.2
See application file for complete search history.

(56) References Cited

U.S. PATENT DOCUMENTS

| | | | | |
|---|---|---|---|---|
| 35,729 A | * | 6/1862 | Butler et al. .................. | 474/72 |
| 82,941 A | * | 10/1868 | Hargrave ...................... | 474/72 |
| 1,469,856 A | * | 10/1923 | Traufler ........................ | 474/81 |
| 1,509,423 A | * | 9/1924 | Garner ........................ | 474/125 |
| 2,504,529 A | * | 4/1950 | Isom ........................... | 474/81 |
| 3,837,231 A | * | 9/1974 | Holmlund .................... | 474/72 |
| 4,446,594 A | * | 5/1984 | Watanabe et al. ........... | 474/122 |

FOREIGN PATENT DOCUMENTS

| | | | |
|---|---|---|---|
| JP | 03-4063 A | * | 1/1991 |
| JP | 06-257461 | | 9/1994 |
| JP | 07-278969 A | * | 10/1995 |
| JP | 09-013979 | | 1/1997 |
| JP | 2000-195140 A | * | 7/2000 |

* cited by examiner

*Primary Examiner*—Marcus Charles
(74) *Attorney, Agent, or Firm*—Nixon Peabody LLP; Donald R. Studebaker

(57) ABSTRACT

In a belt drive system 20 for transmitting torque at a crankshaft 11 of an automotive engine 10 to a supercharger (engine accessory) 130a, an output pulley unit 40 formed of a first flat pulley 50 and a second flat pulley 60 is coupled to the rotational shaft 131a of the supercharger 130a. A flat belt 70 entrained between the output pulley unit 40 and the crank pulley 30 of the crankshaft 11 is shifted from the first flat pulley 50 to the second flat pulley 60 or vice versa by a speed ratio selector 80. The rotational shaft 131a can thereby be driven into rotation with the switching between a high speed ratio during acceleration and a low speed ratio during constant speed cruise. As a result, the supercharger 130a can bring out its capability into full play without using parts involving increases in weight, cost and power consumption, such as a solenoid-operated clutch, and concurrently suppress the deterioration of fuel economy.

2 Claims, 11 Drawing Sheets

PRIOR ART

PRIOR ART

AUTOMOTIVE ENGINE ACCESSORY DRIVE SYSTEM

BACKGROUND OF THE INVENTION (a) Field of the Invention

This invention relates to drive systems for transmitting torque at the crankshaft of an automotive engine to engine accessories including a supercharger, a compressor for an automotive air conditioner, and a generator, and more particularly relates to measures for striking a balance between the acceleration and fuel consumption performances of an automotive engine.

(b) Description of the Related Art

An example of known drive systems for driving a supercharger using torque at an engine crankshaft is a continuous engagement type one in which as schematically shown in FIG. 10, a ribbed belt 204 is entrained between a crank pulley (not shown) as an input member coupled to the engine crankshaft and a ribbed pulley 203 as an output member coupled to a rotational shaft 202 of a supercharger 201. In this system, torque at the crankshaft is transmitted via the ribbed belt 204 to the rotational shaft 202 to rotate the rotational shaft 202 and thereby drive the supercharger 201.

Superchargers generally provide an amount of boost predetermined for full engine load conditions. Therefore, in the supercharger 201 of the continuous engagement type drive system, as shown in FIG. 11, the ratio of the rpm of the rotational shaft (supercharger rpm) to the rpm of the crankshaft (engine rpm), i.e., the speed ratio, is constant (i.e., equal to (the crank pulley diameter)/(ribbed pulley diameter)). This means that at low engine load, the amount of boost becomes excessive and the excess provides a loss of power to drive the supercharger 201, leading to deteriorated fuel economy. In particular, under normal driving conditions, the engine is less likely to fall into full load conditions and therefore the fuel economy problem is outstanding.

As a technique to cope with this problem, there is known one as disclosed in Patent Document 1 (Japanese Unexamined Patent Publication No. 9-13979). In such a technique, an on/off type solenoid-operated clutch is placed in the torque transmission path leading from the crankshaft to the rotational shaft of the supercharger so that at low engine load, torque transmission to the supercharger is shut off to prevent the startup of the supercharger.

Alternatively, there is also known a technique as disclosed in Patent Document 2 (Japanese Unexamined Patent Publication No. 6-257461), in which two solenoid-operated clutches, one for low speed ratio and the other for high speed ratio, are arranged in parallel in the torque transmission path. With this technique, at low engine load, the clutch for low speed ratio is turned on to keep the rpm of the rotational shaft low. Only when engine torque is necessary, the clutch for high speed ratio is turned on to make the rpm of the rotational shaft higher.

Accessories such as a compressor for an automotive air conditioner and a generator, unlike the supercharger, are needed to exhibit a certain level of ability even at low engine rpm, for example, at idling speed. On the other hand, when the engine rpm becomes high during actual cruise, such accessories are driven at an rpm higher than required (waste the drive power) thereby deteriorating fuel economy. Therefore, as also described in the above-mentioned Patent Document 2, it is known that the accessories are driven by selectively using the two solenoid-operated clutches for high speed ratio and low speed ratio.

The above techniques, however, have a problem of increasing the weight, cost and power consumption of the drive system by an added solenoid-operated clutch or clutches.

SUMMARY OF THE INVENTION

The present invention has been made in view of the foregoing, and is directed to an automotive engine accessory drive system in which torque at a crankshaft is transmitted to accessories including a supercharger and an alternator. A principal object of the present invention is to use a lightweight, low-cost and power consumption-free belt drive system without any parts involving increases in weight, cost and power consumption, such as a solenoid-operated clutch, to prevent deterioration of fuel economy while ensuring that such accessories exhibit their abilities into full play.

To attain the above object, in the present invention, an input-side pulley is mounted on a crankshaft, an output-side flat pulley for normal cruise and another output-side flat pulley for low speed cruise or idling operation are mounted coaxially on a driven shaft of an engine accessory, and a flat belt entrained between the input-side pulley and the output-side flat pulley set is shifted in the belt widthwise direction to allow for the switching of the mode of power transmission from the vehicle engine to the engine accessory.

More specifically, a first aspect of the present invention is directed to an automotive engine accessory drive system in which torque at a crankshaft of an automotive engine is transmitted to a rotational shaft of an engine accessory to drive the engine accessory.

The above drive system comprises: an input-side pulley drivingly coupled to the crankshaft; an output-side pulley unit mounted on the rotational shaft of the engine accessory; and a flat belt entrained between the input-side pulley and the output-side pulley unit to transmit torque at the input-side pulley to the output-side pulley unit. The output-side pulley unit includes a first flat pulley and a second flat pulley which are of substantially the same pulley diameter and disposed on the same axis and adjacent to each other. The first flat pulley is connectable to the rotational shaft of the engine accessory to drive the rotational shaft into rotation at a given speed ratio. The second flat pulley is connectable to the rotational shaft of the engine accessory to drive the rotational shaft into rotation at a lower speed ratio ((the rpm of the rotational shaft)/(the rpm of the flat driving pulley)) than that of the first flat pulley. The drive system further comprises a belt shifter for shifting the flat belt from the first flat pulley to the second flat pulley or vice versa.

With the above structure, torque at the crankshaft of the automotive engine is transmitted via the input-side pulley, the flat belt and the output-side pulley unit to the rotational shaft of the engine accessory. During the time, when the flat belt on the output-side pulley unit is shifted to the first flat pulley by the belt shifter, the torque is transmitted via the first flat pulley to the rotational shaft of the engine accessory. The rotational shaft is thereby driven into rotation at a given speed ratio.

On the other hand, when the flat belt on the output-side pulley unit is shifted to the second flat pulley, the torque is transmitted via the second flat pulley to the rotational shaft of the engine accessory. At the time, the second flat pulley drives the rotational shaft into rotation at a lower speed ratio than the first flat pulley. Therefore, for example, even when the rpm of the input-side pulley is higher as compared with the case that the first flat pulley mediates power transmission, the rpm of the rotational shaft is restrained to a small degree.

Now, suppose that the speed ratio in the case of mediation of the first flat pulley is approximately equal to that in the conventional case. When, for example, the engine accessory is a supercharger, a shift of the flat belt to the first flat pulley on the acceleration of the automotive engine at high load allows the rotational shaft of the supercharger to rotate at substantially the same rpm as in the conventional case. As a result, the boosting capability of the supercharger can be brought out as ever. On the other hand, a shift of the flat belt to the second flat pulley on the other engine conditions allows the rotational shaft of the supercharger to rotate at a smaller rpm than in the conventional case. Therefore, the loss in the driving force to be given to the supercharger can be reduced without the use of a speed ratio switching type solenoid-operated clutch as conventionally used. As a result, the deterioration of fuel economy can be reduced accordingly.

For an engine accessory such as a compressor for an automotive air conditioner or a generator, when the flat belt is shifted to the first flat pulley during low engine speed, the rotational shaft of the engine accessory is kept at the same rpm as ever. The capability of the engine accessory can be brought out as ever. On the other hand, when the flat belt is shifted to the second flat pulley during high engine speed, the rotational shaft of the engine accessory can be restrained from increasing its rpm. Also in this case, the loss in the driving force to be given to the engine accessory can be reduced, and therefore the deterioration of fuel economy can be reduced accordingly. Also in this case, if the flat belt is shifted to the second flat pulley on sudden acceleration during low engine speed, this contributes to improvement in the acceleration performance of the vehicle.

In a second aspect of the present invention, the first flat pulley in the first aspect of the invention is replaced with a flat driving pulley connectable to the rotational shaft of the engine accessory to drive the rotational shaft into rotation at a given speed ratio, while the second flat pulley in the first aspect of the invention is replaced with a flat drive disengagement pulley rotatable independent of the rotational shaft of the engine accessory.

With the above structure, when the flat belt on the output-side pulley unit is shifted to the flat driving pulley by the belt shifter, torque transmitted via the flat belt is transmitted via the flat driving pulley to the rotational shaft of the engine accessory. The rotational shaft is thereby driven into rotation at a given speed ratio.

On the other hand, when the flat pulley on the output-side pulley unit is shifted to the flat drive disengagement pulley by the belt shifter, the flat drive disengagement pulley is driven into rotation by the torque transmitted via the flat belt. At the time, since the flat drive disengagement pulley rotates independent of the rotational shaft of the engine accessory, the torque transmitted to the flat drive disengagement pulley is not transmitted to the rotational shaft of the engine accessory. In other words, the torque is blocked from being transmitted to the rotational shaft of the engine accessory.

Now, suppose that the speed ratio in the case of mediation of the flat driving pulley is approximately equal to that in the conventional case. When, for example, the engine accessory is a supercharger, a shift of the flat belt to the flat driving pulley on the acceleration of the automotive engine at full load allows the rotational shaft of the supercharger to rotate at substantially the same rpm as in the conventional case. As a result, the boosting capability of the supercharger can be brought out as ever. On the other hand, a shift of the flat belt to the flat drive disengagement pulley on the other engine conditions allows the rotational shaft of the supercharger to stop rotating. Therefore, the loss in the driving force to be given to the supercharger can be reduced without the use of an on/off switching type solenoid-operated clutch as conventionally used. As a result, the deterioration of fuel economy can be reduced accordingly.

According to the first aspect of the invention, as described above, in the automotive engine accessory drive system in which torque at the crankshaft of the automotive engine is transmitted to the rotational shaft of the engine accessory to drive the engine accessory, the flat belt, which is entrained between the input-side pulley drivingly coupled to the crankshaft and the output-side pulley unit composed of first and second flat pulleys each connectable to the rotational shaft of the engine accessory, is shifted from the first to the second flat pulley or vice versa by the belt shifter. As a result, the rotational shaft of the engine accessory can be driven into rotation with the switching between a given speed ratio and a lower speed ratio, without the use of any solenoid-operated clutch as conventionally used.

As a result, when, for example, the engine accessory is a supercharger, on the acceleration of the engine at high load, the flat belt is shifted to the first flat pulley to bring out the boosting capability of the supercharger as ever. On the other hand, on the other engine conditions, the flat belt is shifted to the second flat pulley to restrain the operation of the supercharger. Therefore, the loss in the driving force to be given to the supercharger can be reduced without inducing increases in weight, cost and power consumption, and the deterioration of fuel economy of the vehicle engine can thereby be suppressed.

For an engine accessory such as an alternator or a power steering pump, during low engine speed, the flat belt is shifted to the first flat pulley to keep the rotational shaft of the engine accessory at the same rpm as ever. On the other hand, during high engine speed, the flat belt is shifted to the second flat pulley to restrain the rotational shaft of the engine accessory from increasing its rpm. Also in this case, the loss in the driving force to be given to the engine accessory can be reduced without inducing increases in weight, cost and power consumption, and the deterioration of fuel economy can be suppressed.

According the second aspect of the invention, in the automotive engine accessory drive system, the flat belt, which is entrained between the input-side pulley drivingly coupled to the crankshaft and the output-side pulley unit composed of flat driving and flat drive disengagement pulleys mounted on the rotational shaft of the engine accessory, is shifted from the flat driving pulley to the flat drive disengagement pulley or vice versa by the belt shifter so that torque transmission to the rotational shaft of the engine accessory can be selectively provided or shut off without the use of any solenoid-operated clutch as conventionally used.

As a result, when, for example, the engine accessory is a supercharger, on the acceleration of the automotive engine at high load, the flat belt is shifted to the flat driving pulley to bring out the boosting capability of the supercharger as ever. On the other hand, on the other engine conditions, the flat belt is shifted to the flat drive disengagement pulley to prevent the startup of the supercharger. Therefore, the loss in the driving force to be given to the supercharger can be reduced without inducing increases in weight, cost and power consumption, and the deterioration of fuel economy of the vehicle engine can thereby be suppressed.

DESCRIPTION OF THE PREFERRED EMBODIMENTS

Hereinafter, description will be given of embodiments of the present invention with reference to the drawings.

Embodiment 1

Figure 1:
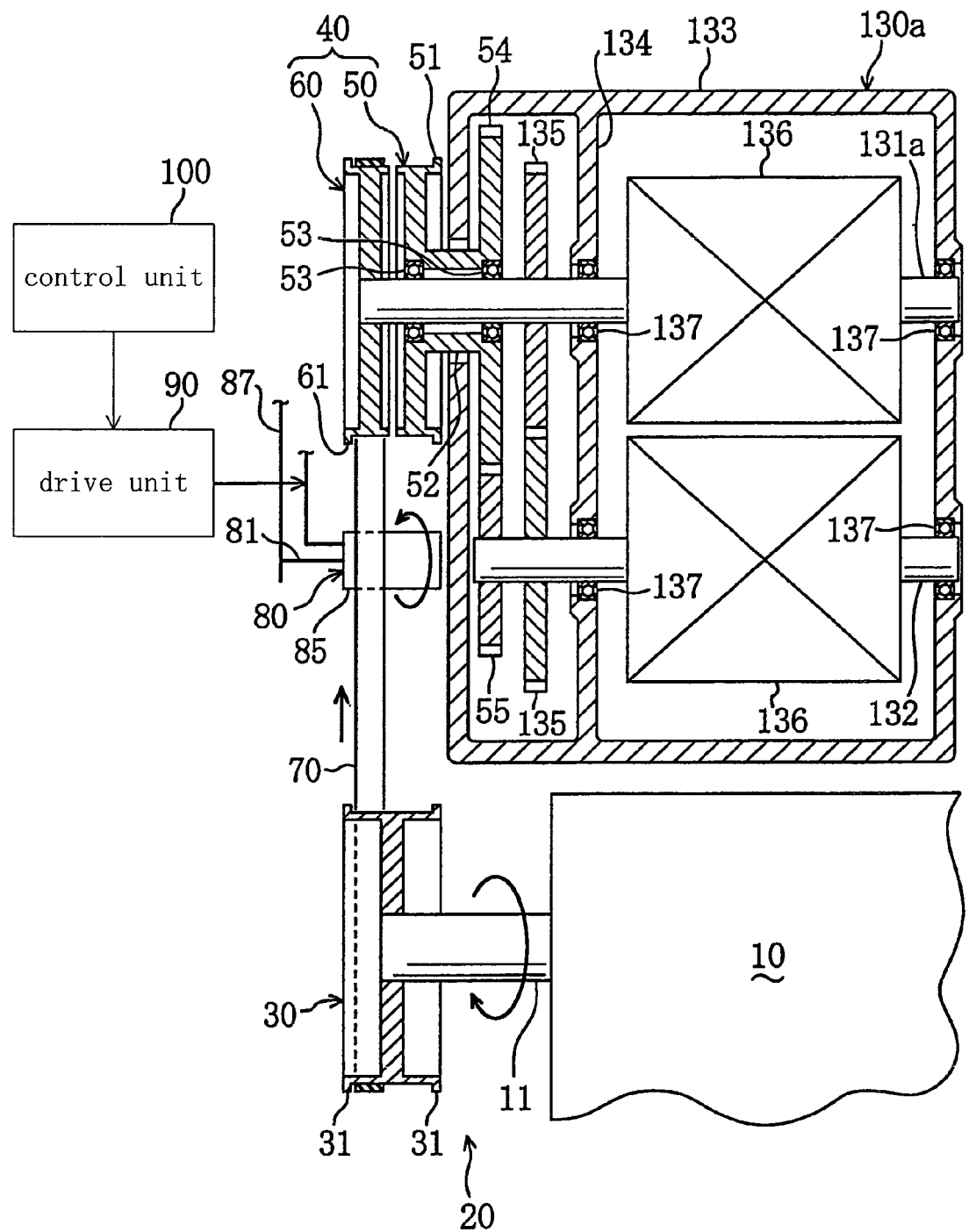
FIG. 1 is a cross-sectional view showing the entire structure of a supercharger drive system according to a first embodiment of the present invention.

FIG. 1 shows the entire structure of a supercharger drive system according to a first embodiment of the present invention. This system is used to drive a supercharger 130a, which is an automotive engine accessory, by torque at a crankshaft 11 of an engine 10.

The supercharger 130a is of roots type that has a pair of lobed rotors 136 and 136 in a housing 133, and is disposed in an intake system leading from an air cleaner of the vehicle to an intake port of the engine 10, though they are not shown. One of the two rotors 136 and 136 is mounted on a first rotational shaft 131a for unitary rotation. The first rotational shaft 131a is a rotational shaft whose one end (left end in FIG. 1) extends outside the housing 133. The other rotor 136 is mounted on a second rotational shaft 132 for unitary rotation. The second rotational shaft 132 is placed in parallel with the first rotational shaft 131a. The rotational shafts 131a and 132 are each supported rotatably through two bearings 137 and 137 to the outer wall and the inner wall 134 of the housing 133. A pair of constant-mesh synchronized gears 135 and 135 are mounted on the rotational shafts 131a and 132, respectively, for unitary rotation, which allows the rotors 136 and 136 to rotate in opposite directions at the same speed.

In this embodiment, a flat belt drive system 20 is disposed in a torque transmission path leading from the crankshaft 11 of the automotive engine 10 to the first rotational shaft 131a of the supercharger 130a.

The belt drive system 20 includes a flat, crank pulley (an input-side pulley) 30 coupled to the crankshaft 11 for unitary rotation, an output pulley unit (an output-side pulley unit) 40 mounted on the first rotational shaft 131a, and a flat belt 70 entrained between the crank pulley 30 and the output pulley unit 40.

The crank pulley 30 are provided at both axial ends with circumferential flanges 31 and 31 abuttable on side faces of the flat belt 70 on the crank pulley 30, respectively. The axial dimension between both the flanges 31 and 31 is set to be greater than twice the width of the flat belt 70.

The output pulley unit 40 includes a first pulley (first flat pulley) 50 which is a flat pulley, and a second pulley (second flat pulley) 60 which is a flat pulley. Both the first and second pulleys 50 and 60 are arranged adjacently on the same axis and spaced away from each other by a smaller distance than the width of the flat belt 70. The first and second pulleys 50 and 60 have the same pulley diameter as the crank pulley 30, and therefore rotate at the same speed as the crank pulley 30. The axial dimension of the contact surface of each of the pulleys 50 and 60 with the flat belt 70 is substantially the same as the width of the flat belt 70. Axial ends of the pulleys 50 and 60 corresponding to both axial ends of the output pulley unit 40 are provided with circumferential flanges 51 and 61 abuttable on side faces of the flat belt 70 on the output pulley unit 40, respectively. The flange 51 on the first pulley 50 side (right side in FIG. 1) is substantially in the same plane with the flange 31 of the crank pulley 30 located on the engine 10 side (right side in FIG. 1), while the flange 61 on the second pulley 60 side (left side in FIG. 1) is substantially in the same plane with the flange 31 of the crank pulley 30 located on the opposite side to the engine 10 (left side in FIG. 1).

The first pulley 50 has a cylindrical boss 52 provided to pass through the outer wall of the housing 133 of the supercharger 130a, and is supported relatively rotatably to the first rotational shaft 131a through two bearings 53 and 53 disposed at both axial ends of the boss 52. A large gear 54 having a larger pitch diameter than the first pulley 50 is mounted on the end of the boss 52 located inside of the housing 133 to allow unitary rotation together with the first pulley 50. On the other hand, a small gear 55 smaller in pitch diameter than and in constant mesh with the large gear 54 is mounted on the end of the second rotational shaft 132 located between the inner wall 134 and the outer wall of the housing 133 to allow unitary rotation together with the second rotational shaft 132. This gear arrangement permits the first rotational shaft 131a to rotate at a higher speed than the first pulley 50. Therefore, when driven into rotation via the first pulley 50, the first rotational shaft 131a rotates at a higher rpm than the rpm of the engine 10. The speed ratio for this transmission path leading from the first pulley 50 to the first rotational shaft 131a is used on vehicle acceleration.

The second pulley 60 is mounted on the first rotational shaft 131a for unitary rotation, which allows the first rotational shaft 131a to rotate at the same speed as the second pulley 60. Therefore, when the second pulley 60 rotates, the first rotational shaft 131a is driven into rotation at the same rpm as the rpm of the engine 10. The speed ratio for this transmission path leading from the second pulley 60 to the first rotational shaft 131a is smaller than the above speed ratio on vehicle acceleration and is used on constant speed cruise.

The belt drive system 20 also includes a speed ratio selector 80 as a belt shifter for shifting the flat belt 70 on the output pulley unit 40 from the first pulley 50 to second pulley 60 or vice versa.

Figure 2:
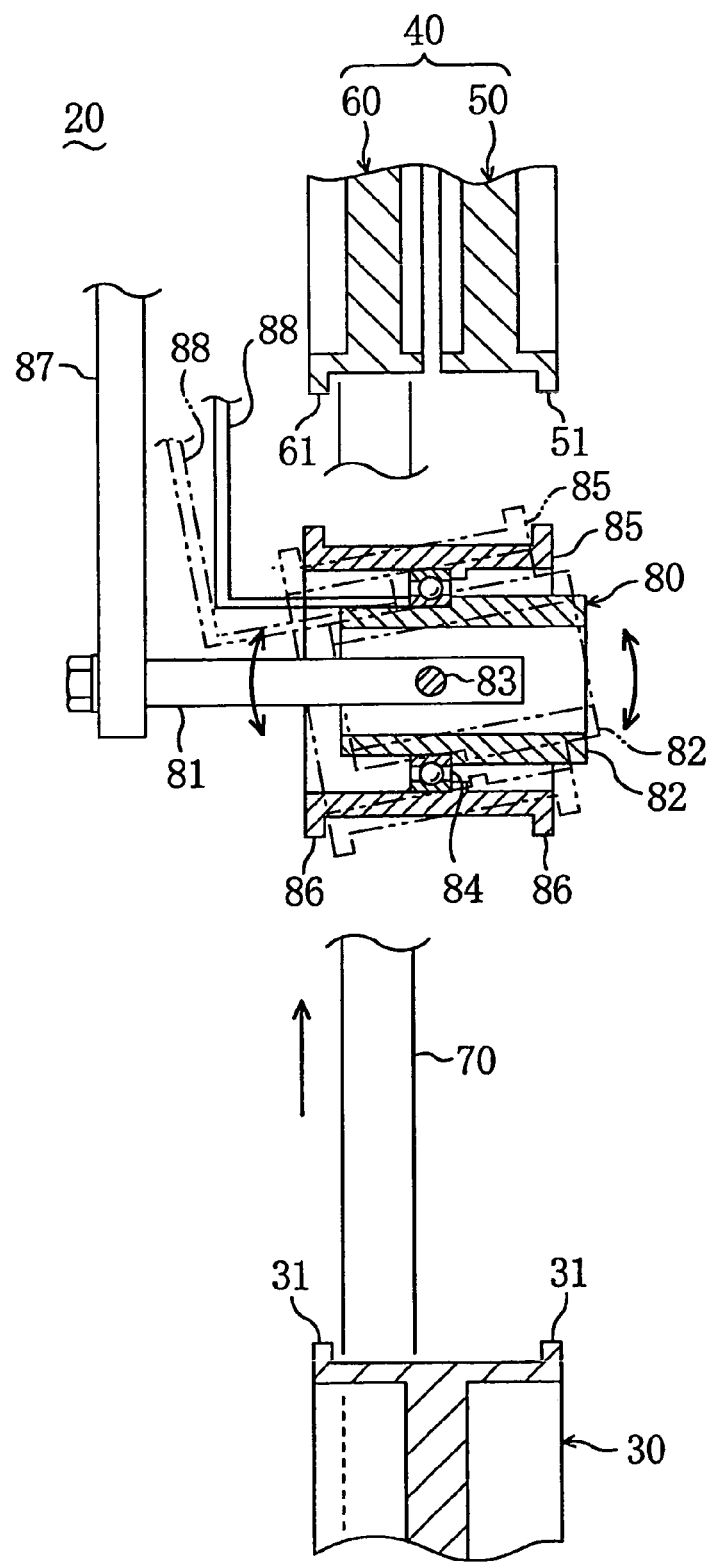
FIG. 2 is an enlarged cross-sectional view showing the structure of a speed ratio selector.

More specifically, as shown in detail in FIG. 2, the speed ratio selector 80 has a support shaft 81 which is placed toward the outside surface of the slack-side span of the flat belt 70 between the crank pulley 30 and the output pulley unit 40 to extend in parallel with the first and second rotational shafts 131a and 132 of the supercharger 130a. A cylindrical oscillating member 82 is fitted loosely around the support shaft 81. The oscillating member 82 is disposed to oscillate in a plane substantially parallel to the surface of the slack-side span of the flat belt 70 by a pivot pin 83 placed through the support shaft 81 in the direction orthogonal to the axis of the support shaft 81 and orthogonal to the direction transverse to the first and second rotary shafts 131a and 132 (in the vertical direction in FIG. 2). A tension pulley 85 is rotatably mounted via a bearing 84 on the oscillating member 82. The tension pulley 85 is formed of a flat pulley with flanges 86 and 86 extending at both axial ends. The axial dimension between both the flanges 86 and 86 of the tension pulley 85 is set to be slightly larger than the width of the flat belt 70.

Furthermore, the support shaft 81 is coupled in the form of a cantilever to the swinging end of a swing arm 87 to move close to or away from the slack-side span of the flat belt 70. The swing arm 87 is in turn coupled to a biasing member (not shown) for urging the swing arm 87 into angular movement to allow the tension pulley 85 to push the slack-side span of the flat belt 70 and thereby apply a tension to the flat belt 70.

From the oscillating member 82, an operating lever 88 extends for oscillatably operating the tension pulley 85 by oscillating the oscillating member 82 about the pivot pin 83. With this arrangement, the tension pulley 85 can be switched between a high speed ratio position and a low speed ratio position. The high speed ratio position is the position of the tension pulley 85 where its axially one side toward the first pulley 50 (right portion in FIG. 2, hereinafter referred to as a first pulley side portion) is located closer to the backward side of the slack-side span of the flat belt 70 in the direction of belt travel than its axially other side toward the second pulley 60 (left portion in FIG. 2, hereinafter referred to as a second pulley side portion). The low speed ratio position is, as shown in the imaginary lines in FIG. 2, the position of the tension pulley 85 where its second pulley side portion is located closer to the backward side of the belt slack-side span in the direction of belt travel than the first pulley side portion.

In the high speed ratio position of the tension pulley 85, the running direction of the tension pulley 85 at the contact surface with the flat belt 70 is inclined toward the first pulley 50 with respect to the direction of belt travel. As a result, a force is applied to the flat belt 70 to shift it toward the first pulley 50, whereby the flat belt 70 shifts entirely toward the first pulley 50. On the other hand, when the tension pulley 85 falls into the low speed ratio position, the running direction of the tension pulley 85 at the contact surface with the flat belt 70 is inclined toward the second pulley 60 with respect to the direction of belt travel. As a result, a force is applied to the flat belt 70 to shift it toward the second pulley 60, whereby the flat belt 70 shifts entirely toward the second pulley 60.

The belt drive system 20 is also coupled to a drive unit 90 and a control unit 100. The drive unit 90 drives the operating lever 88 to allow the oscillation of the tension pulley 85. The control unit 100 determines the driver's intension on the degree of necessity for boosting of the supercharger 130a based on parameters such as the throttle opening and the rpm of the automotive engine 10, and controls the drive unit 90 based on the determination. For example, when determining that the engine is in full load conditions and the driver has an intention to accelerate, the control unit 100 controls the drive unit 90 to allow the tension pulley 85 of the speed ratio selector 80 to tilt to the high speed ratio position to drive the first rotational shaft 131a of the supercharger 130a into rotation at a high rpm. On the other hand, when determining that the case does not apply, the control unit 100 controls the drive unit 90 to allow the tension pulley 85 to tilt to the low speed ratio position to drive the first rotational shaft 131a of the supercharger 130a into rotation at a lower rpm than that in the high speed ratio position.

Figure 3:
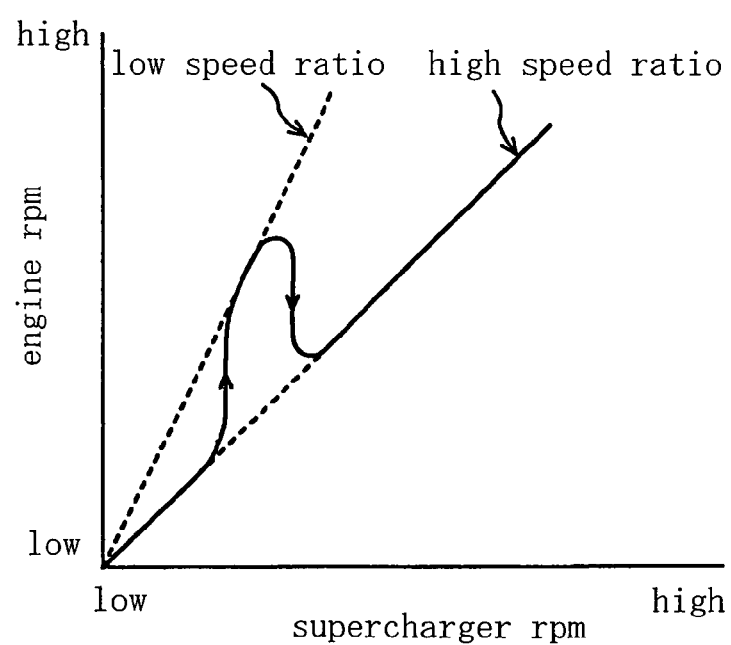
FIG. 3 is a plot showing the characteristic relationship between the rpm of an engine and the rpm of a first rotational shaft of the supercharger.

The operation of the supercharger drive system 20 having the above structure will be described with reference to the characteristic relation between the engine rpm and the rpm of the first rotational shaft 131a of the supercharger 130a as shown in FIG. 3. In this figure, the two lines passing through the origin indicate characteristics when the speed ratio selector 80 is switched to the high speed ratio position and the low speed ratio position, respectively.

For example, at a sudden start of a vehicle from a full stop, if the control unit 100 determines that the driver is accelerating the vehicle at full load, it controls the drive unit 90 to allow the tension pulley 85 of the speed ratio selector 80 to tilt to the high speed ratio position. Then, the flat belt 70 shifts from the second pulley 60 to the first pulley 50, and torque at the crankshaft 11 of the engine 10 is thereby transmitted through the crank pulley 30 and the flat belt 70 to the first pulley 50. As a result, the first rotational shaft 131a is driven into rotation at a higher rpm than the engine 10. Therefore, the supercharger 130a can bring out its boosting capability into full play.

Thereafter, when the vehicle runs at substantially constant speed, the control unit 100 determines that the engine 10 is at low load or the driver is not accelerating the vehicle even with the engine at high load, and controls the drive unit 90 to allow the tension pulley 85 of the speed ratio selector 80 to tilt from the high speed ratio position to the low speed ratio position. Then, the flat belt 70 shifts from the first pulley 50 to the second pulley 60, and torque at the crankshaft 11 of the engine 10 is thereby transmitted through the crank pulley 30 and the flat belt 70 to the second pulley 60. As a result, the first rotational shaft 131a is driven into rotation at the same rpm as the engine 10. Thereby, the boosting capability of the supercharger 130a can be restrained.

Next, when the control unit 100 determines again that the engine is at high load and the driver is accelerating the vehicle, it controls the drive unit 90 to allow the tension pulley 85 of the speed ratio selector 80 to tilt from the low speed ratio position to the high speed ratio position. Then, the flat belt 70 shifts from the second pulley 60 to the first pulley 50, and torque at the crankshaft 11 of the engine 10 is thereby transmitted again to the first pulley 50. As a result, the first rotational shaft 131a is driven into rotation at a higher rpm than the engine 10. Therefore, the supercharger 130a can again bring out its boosting capability into full play.

As described above, in the supercharger drive system 20 of this embodiment for transmitting torque at the crankshaft 11 of the vehicle engine 10 to the first rotational shaft 131a of the supercharger 130a, the flat belt 70 is entrained between the crank pulley 30 coupled to the crankshaft 11 and the output pulley unit 40 composed of the first and second pulleys 50 and 60 each connectable to the first rotational shaft 131a of the supercharger 130a. According to this embodiment, the flat belt 70 is shifted from the first pulley 50 to the second pulley 60 or vice versa by the speed ratio selector 80. As a result, the first rotational shaft 131a of the supercharger 130a can be driven into rotation with the switching between the speed ratio for acceleration and the speed ratio for lower constant speed.

Furthermore, on the acceleration of the engine 10 at high load, the flat belt 70 is shifted to the first pulley 50 to bring out the boosting capability of the supercharger 130a into full play as ever. On the other hand, when it is not the case, the flat belt 70 is shifted to the second pulley 60 to restrain the operation of the supercharger 130a. Therefore, there is no need to use any solenoid-operated clutch unlike before, the loss in the driving force of the supercharger 130a can be reduced, and the deterioration of fuel economy of the vehicle engine can be suppressed. As a result, the fuel economy can be improved without inducing increases in weight, cost and power consumption and without impairing the acceleration performance of the supercharger 130a.

In this embodiment, the rpm of the first rotational shaft 131a of the supercharger 130a becomes higher than the rpm of the engine 10 on the switching of the speed ratio selector 80 to the high speed ratio side, while the rpm of the first rotational shaft 131a of the supercharger 130a becomes equal to that of the engine 10 on the switching of the speed ratio selector 80 to the low speed ratio side. In the present invention, however, the relationship between the high speed ratio and the low speed ratio is relative, and therefore it is also possible, for example, to set the high and low speed ratios so that the rpm of the first rotational shaft 131a may become higher than the engine rpm even at both the two speed ratios, or inversely, so that the rpm of the first rotational shaft 131a may become lower than the engine rpm even at both the two speed ratios.

Although this embodiment describes the case where the engine accessory is a supercharger 130a, the present invention is also applicable to the other engine accessories.

Embodiment 2

Figure 4:
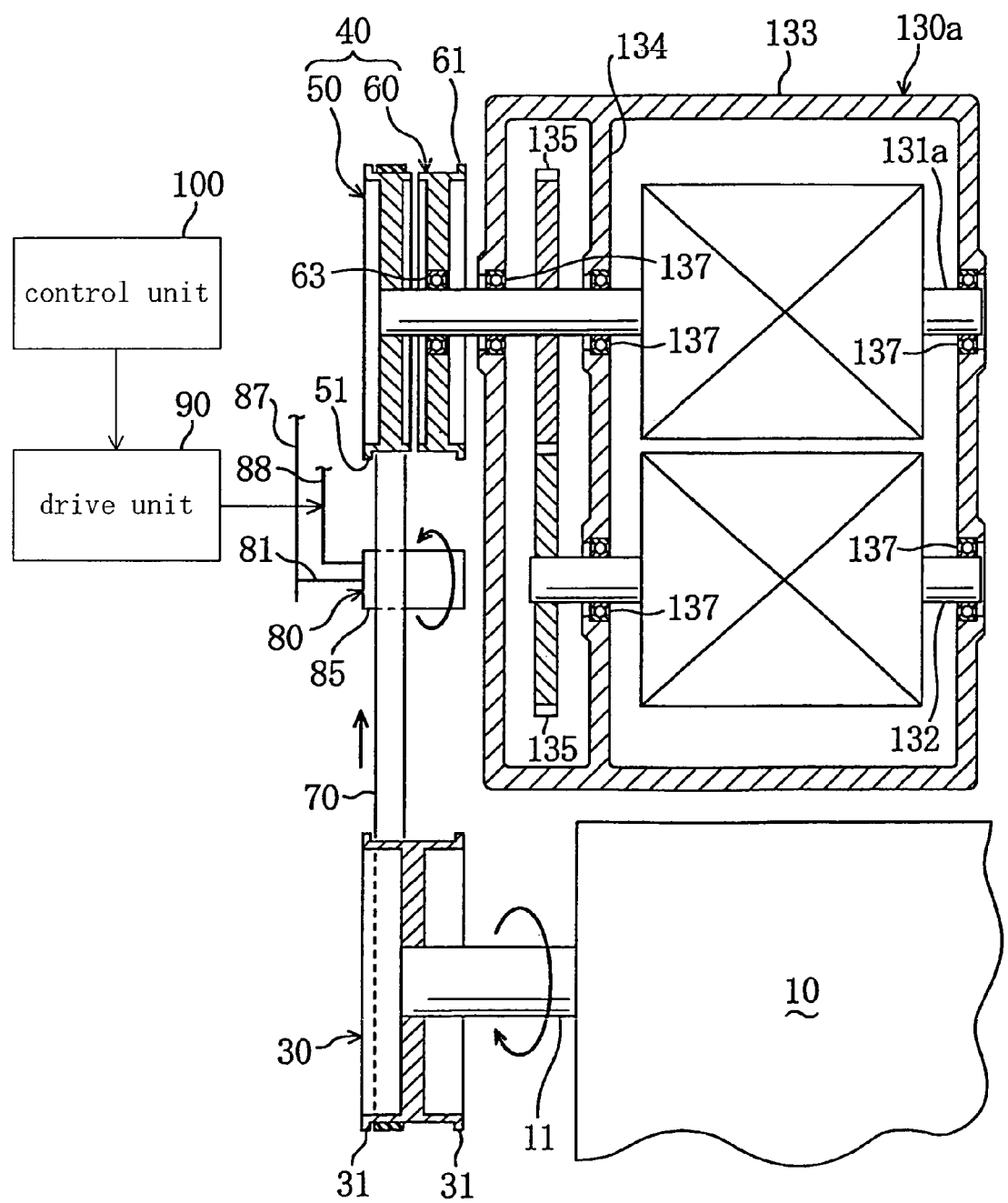
FIG. 4 is a corresponding view to FIG. 1, showing the entire structure of a supercharger drive system according to a second embodiment of the present invention.

FIG. 4 schematically shows the entire structure of a supercharger drive system according to a second embodiment of the present invention. Like parts as in the first embodiment are indicated by like reference numerals.

In the present embodiment, the output pulley unit 40 of the drive system 20 is composed of a driving pulley 50 and an idler pulley 60. The driving pulley 50 is a flat pulley for power transmission mounted on the first rotational shaft 131a of the supercharger 130a for unitary rotation. The idler pulley 60 is a flat pulley for drive disengagement placed on the supercharger 130a side (right side) of the driving pulley 50 relatively rotatably to the first rotational shaft 131a. When the driving pulley 50 rotates, the first rotational shaft 131a rotates at the same speed as the driving pulley 50 and is thereby driven into rotation at the same rpm as that of the engine 10. On the other hand, when the idler pulley 60 rotates, the first rotational shaft 131a enters into a rotatable condition relative to the idler pulley 60, i.e., into a condition that it is blocked from being driven into rotation.

Furthermore, the speed ratio selector 80 of this embodiment serves as an on/off selector for switching on/off the torque transmission to the first rotational shaft 131a of the supercharger 130a.

Figure 5:
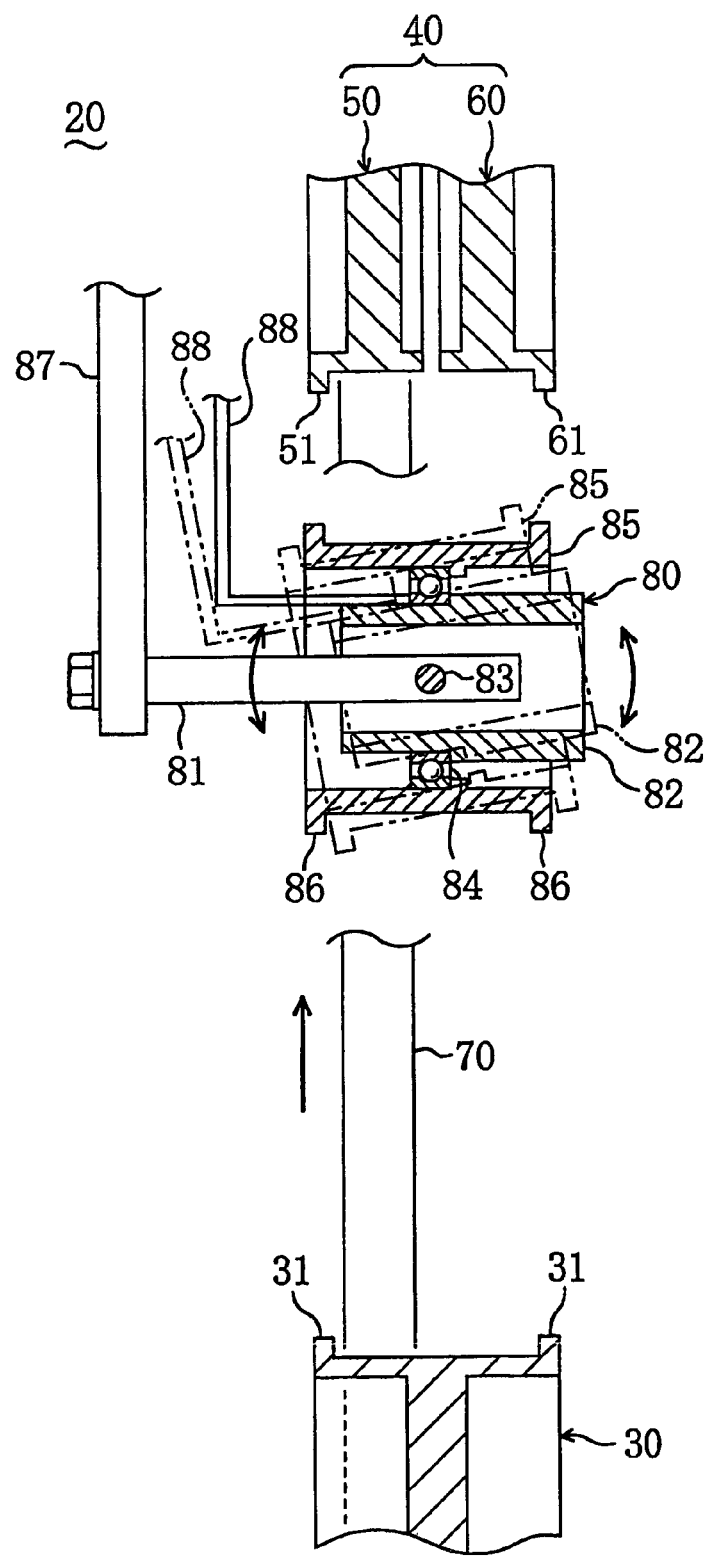
FIG. 5 is a corresponding view to FIG. 2, showing the structure of an on/off selector.

More specifically, as shown in enlarged detail in FIG. 5, the tension pulley 85 of the on/off selector 80 is designed to oscillate between an on position and an off position. The on position is the position of the tension pulley 85 where its driving pulley 50 side (left side in FIG. 5) is located more backward with respect to the direction of belt travel than its idler pulley 60 side (right side in FIG. 5). The off position is the position of the tension pulley 85 where its idler pulley 60 side is located more backward with respect to the direction of belt travel than its driving pulley 50 side. When the tension pulley 85 tilts to the on position, the running direction of the tension pulley 85 at the contact surface with the flat belt 70 accordingly inclines toward the driving pulley 50 side (left side in FIG. 5) with respect to the direction of belt travel to guide the flat belt 70 to shift toward the driving pulley 50. As a result, the flat belt 70 entirely shifts to the driving pulley 50. On the other hand, when the tension pulley 85 tilts to the off position, the running direction of the tension pulley 85 at the contact surface with the flat belt 70 accordingly inclines toward the idler pulley 60 side (right side in FIG. 5) with respect to the direction of belt travel to guide the flat belt 70 to shift toward the idler pulley 60. As a result, the flat belt 70 entirely shifts to the idler pulley 60.

Furthermore, when the control unit 100 determines, for example, that the engine 10 is in full load conditions and the driver is accelerating the vehicle, it controls the drive unit 90 to allow the tension pulley 85 of the on-off selector 80 to tilt to the on position to drive the first rotational shaft 131a of the supercharger 130a into rotation. When the control unit 100 determines the case does not apply, it controls the drive unit 90 to allow the tension pulley 85 to tilt to the off position to stop the first rotational shaft 131a being driven into rotation.

Next, the operation of the supercharger drive system 20 having the above structure will be described.

For example, at a sudden start of a vehicle from a full stop, if the control unit 100 determines that the driver is accelerating the vehicle at full load, it controls the drive unit 90 to allow the tension pulley 85 of the on/off selector 80 to tilt to the on position. Then, the flat belt 70 shifts from the idler pulley 60 to the driving pulley 50, and torque at the crankshaft 11 of the engine 10 is thereby transmitted through the crank pulley 30 and the flat belt 70 to the driving pulley 50. As a result, the first rotational shaft 131a is driven into rotation. Therefore, the supercharger 130a can bring out its boosting capability.

Thereafter, when the vehicle runs at substantially constant speed, the control unit 100 determines that the engine 10 is at low load or the driver is not accelerating the vehicle even with the engine at high load, and controls the drive unit 90 to allow the tension pulley 85 of the on/off selector 80 to tilt from the on position to the off position. Then, the flat belt 70 shifts from the driving pulley 50 to the idler pulley 60, and torque at the crankshaft 11 of the engine 10 is thereby transmitted through the crank pulley 30 and the flat belt 70 to the idler pulley 60. This stops the first rotational shaft 131a of the supercharger 130a being driven into rotation. Thereby, the loss in the driving force of the supercharger 130a can be eliminated.

Next, when the control unit 100 determines again that the engine is at high load and the driver is accelerating the vehicle, it controls the drive unit 90 to allow the tension pulley 85 of the on/off selector 80 to tilt from the off position to the on position. Then, the flat belt 70 shifts from the idler pulley 60 to the driving pulley 50, and torque at the crankshaft 11 of the engine 10 is thereby transmitted again through the crank pulley 30 and the flat belt 70 to the driving pulley 50. As a result, the first rotational shaft 131a of the supercharger 130a is driven into rotation. Therefore, the supercharger 130a can again bring out its boosting capability.

Figure 6:
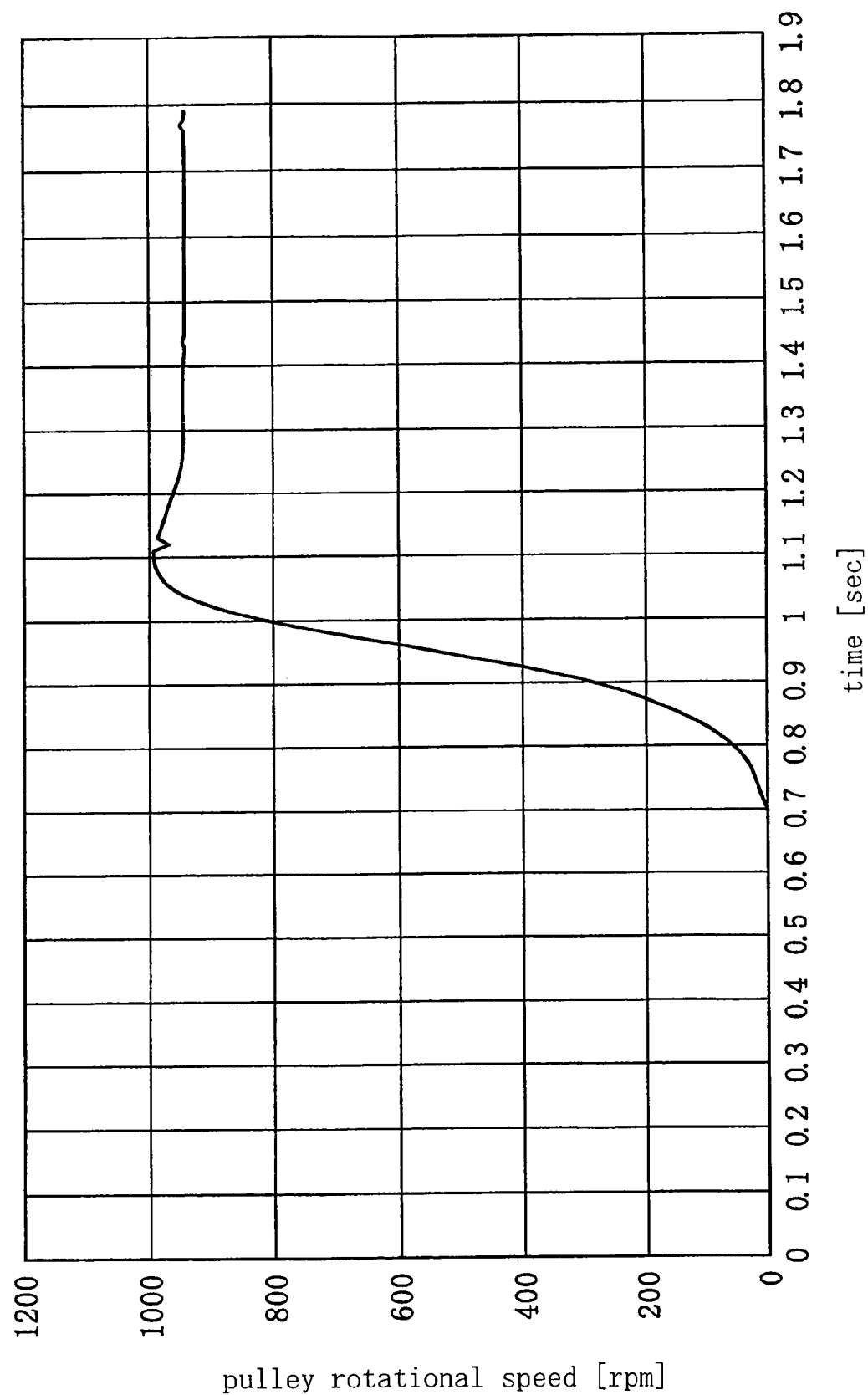
FIG. 6 is a graph showing the change in the rpm of a first rotational shaft with the shifting of a flat belt.

With reference to the table of FIG. 6, description will now be given of the change in the rpm of the driving pulley 50 when the running flat belt 70 has been shifted from the idler pulley 60 rotating at 950 rpm to the driving pulley 50 non-rotating at 0 rpm under the conditions that the crank pulley 30 of the drive system 20 has the same diameter as the driving pulley 50 and the idler pulley 60 and the rotation of the crank pulley 30 is kept at 950 rpm. The table shows that the rotating speed of the driving pulley changes very modestly from 0 rpm to 950 rpm. It can be inferred from this that noise production due to belt-pulley contact is small in spite of the contact between the flat belt 70 and the driving pulley 50 at different speeds. This is probably because a substantially constant tension continues to be applied to the flat belt 70. In other words, the absence of sudden tension change in the flat belt 70 means that the shortening of the belt life due to such sudden tension change is less likely to occur.

Next, description will be given of the comparison between the above drive system 20 and the conventional drive system equipped with a solenoid-operated clutch. In the conventional system, the power consumption when the on position is continued is generally 40 W to 60 W. In the system of this embodiment, when a solenoid is used as a drive unit 90, the power consumption is about 0.2 W to about 1.0 W. While the weight of the conventional system is 1.5 kg to 2.2 kg, the weight of the system of this embodiment is half or less of that of the conventional system. The cost index is 40 for the system of this embodiment based on 100 for the conventional system.

As described above, in the drive system 20 of this embodiment for transmitting torque at the crankshaft 11 of the vehicle engine 10 to the first rotational shaft 131a of the supercharger 130a to drive the supercharger 130a, the flat belt 70 is entrained between the crank pulley 30 on the crankshaft 11 and the output pulley unit 40 composed of the driving pulley 50 coupled to the first rotational shaft 131a and the idler pulley 60 rotatable relative to the first rotational shaft 131a. According to this embodiment, the flat belt 70 is shifted from the driving pulley 50 to the idler pulley 60 or vice versa by the on/off selector 80. As a result, torque transmission to the first rotational shaft 131a of the supercharger 130a can be provided or interrupted without any solenoid-operated clutch that would has conventionally been used.

Therefore, on the acceleration of the engine 10 at high load, the flat belt 70 is shifted to the driving pulley 50 to bring out the boosting capability of the supercharger 130a as ever. On the other hand, when it is not the case, the flat belt 70 is shifted to the idler pulley 60 so as not to drive the supercharger 130a. Therefore, the loss in the driving force of the supercharger 130a can be reduced, and the deterioration of fuel economy of the vehicle engine 10 can be suppressed. As a result, the same effects as in the first embodiment can be obtained.

In this embodiment, the rpm of the first rotational shaft 131a of the supercharger 130a becomes equal to the engine rpm when the on/off selector 80 is in the on position. However, an arbitral setting can be made, as necessary, to the rpm of the first rotational shaft 131a with respect to the engine rpm when the on/off selector 80 is in the on position.

Although this embodiment describes the case where the engine accessory is a supercharger 130a, the present invention is also applicable to the other engine accessories.

Embodiment 3

Figure 7:
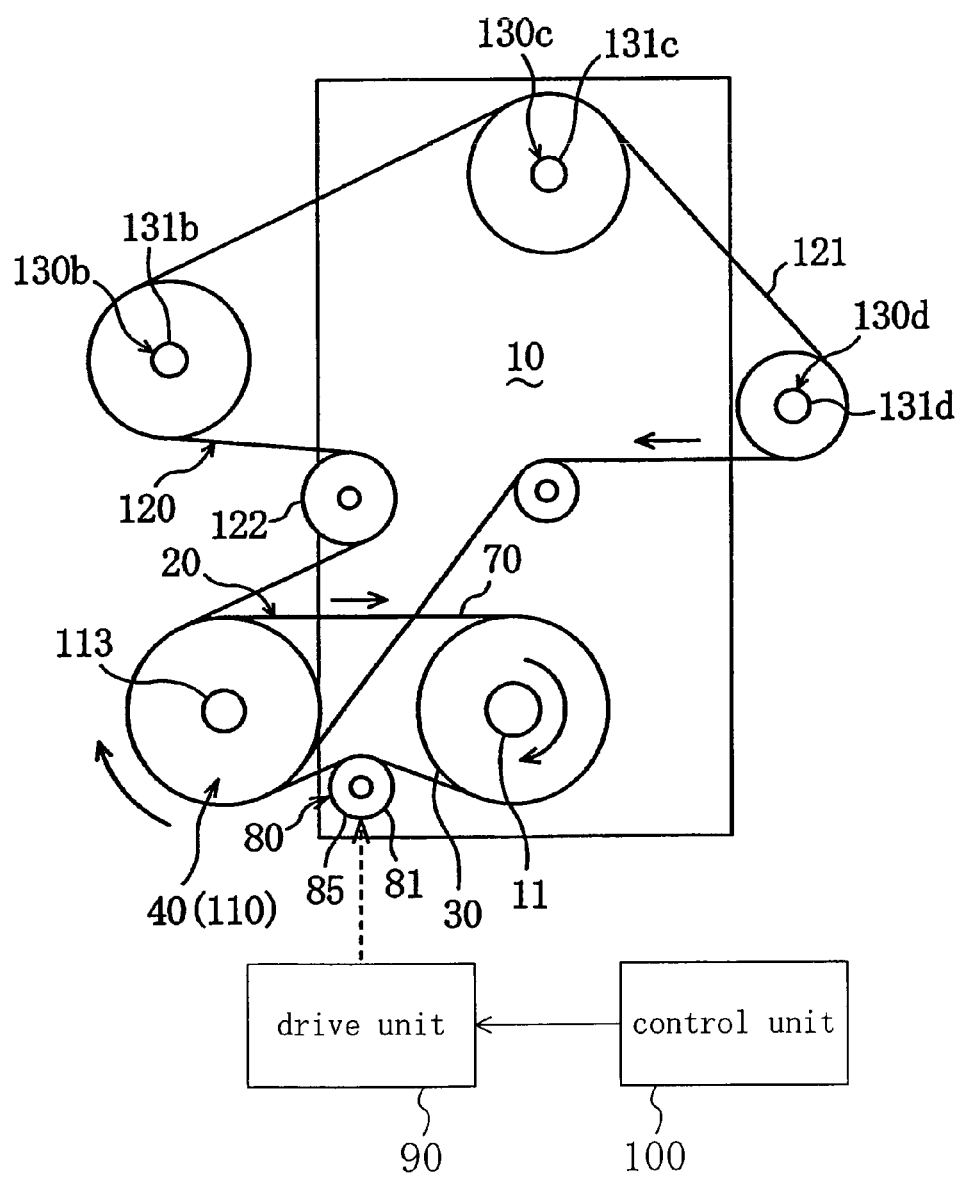
FIG. 7 is a layout diagram schematically showing the entire structure of an engine accessory drive system according to a third embodiment of the present invention.

FIG. 7 schematically shows the layout of a vehicle engine accessory drive system according to a third embodiment of the present invention. In this embodiment, a serpentine belt drive system 120 as well as a flat belt drive system 20 are used. In the serpentine belt drive system 120, torque at the crankshaft 11 of the engine 10 is transmitted via a single power transmission belt to a plurality of engine accessories 130b to 130d.

First, description will be given of the serpentine belt drive system 120. This drive system 120 comprises a ribbed pulley 110 rotatably supported to the support shaft 113, a ribbed pulley 138b coupled unitarily rotatably to a rotational shaft 131b of a generator 130b which is an engine accessory, a ribbed pulley 138c coupled unitarily rotatably to a rotational shaft 131c of a power steering pump 130c which is an engine accessory, and a ribbed pulley 138d. coupled unitarily rotatably to a rotational shaft 131d of a compressor 130d for an automotive air conditioner which is an engine accessory. A ribbed belt 121 serving as the above-mentioned power transmission belt is entrained about the ribbed pulleys 110, 138b to 138d. Furthermore, a tensioner 122 is placed at a slack-side span of the ribbed belt 121 between the ribbed pulley 110 and the ribbed pulley 138b of the generator 130b to push the slack-side span to apply a tension to the ribbed belt 121.

Furthermore, in this embodiment, a flat belt drive system 20 is provided in a torque transmission path leading from the crankshaft 11 of the engine 10 to the ribbed pulley 110 of the serpentine belt drive system 120.

The flat belt drive system 20 includes a crank pulley (an input-side pulley) 30 formed of a flat pulley coupled to the crankshaft 11 for unitary rotation, an output pulley unit (an output-side pulley unit) 40 disposed on the ribbed pulley 110 side of the serpentine belt drive system 120, and a flat belt 70 entrained between the crankshaft 30 and the output pulley unit 40.

Figure 8:
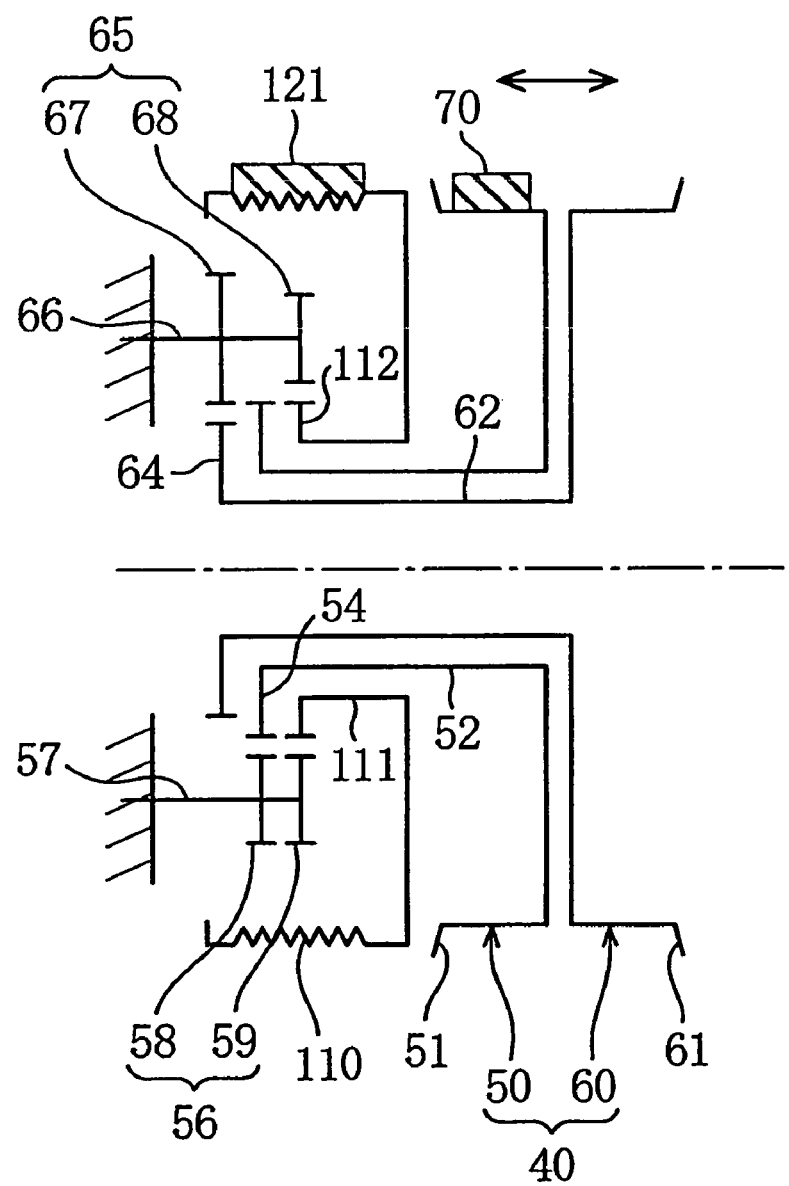
FIG. 8 is a longitudinal cross section schematically showing the relation between an output pulley unit of an engine accessory belt drive system and a ribbed pulley of a serpentine belt drive system.

More specifically, the crank pulley 30 are provided at both axial ends with circumferential flanges 31 and 31 abuttable on side faces of the flat belt 70 on the crank pulley 30, respectively. The output pulley unit 40 is, as schematically shown in FIG. 8, composed of a first pulley 50 and a second pulley 60 which are flat pulleys of the same diameter and mounted on the same axis as the ribbed pulley 110 of the serpentine belt drive system 120. The first pulley 50 is disposed adjacent to the ribbed pulley 110 (on the left side of the output pulley unit 40 in FIG. 8), while the second pulley 60 is disposed on the opposite side of the ribbed pulley 110 with respect to the first pulley 50 (on the right side of the output pulley unit 40 in FIG. 8).

The width of the contact surface of each of the first and second pulleys 50 and 60 with the flat belt 70 is substantially the same as the width of the flat belt 70. Axial ends of the pulleys 50 and 60 corresponding to both axial ends of the output pulley unit 40 are provided with circumferential flanges 51 and 61 abuttable on side faces of the flat belt 70 on the output pulley unit 40, respectively. The flange 51 on the first pulley 50 side is substantially in the same plane with the flange 31 of the crank pulley 30 located on the engine 10 side, while the flange 61 on the second pulley 60 side is substantially in the same plane with the flange 31 of the crank pulley 30 located on the opposite side to the engine 10.

The first and second pulleys 50 and 60 have cylindrical bosses 52 and 62 provided to pass through the axis of the ribbed pulley 110. The boss 52 of the first pulley 50 is fitted relatively rotatably on the boss 62 of the second pulley 62 via a bearing (not shown). A large gear 54 is mounted on the end of the boss 52 located toward the ribbed pulley 110. The boss 62 of the second pulley 60 is fitted relatively rotatably on the support shaft 113 of the ribbed pulley 110 via a bearing (not shown). A small gear 64 smaller in pitch diameter than the large gear 54 of the first pulley 50 is mounted on the end of the boss 62 located toward the ribbed pulley 110 and disposed adjacent to the large gear 54. Furthermore, on the boss 52 of the first pulley 50, a boss 111 on the ribbed pulley 110 is fitted via an unshown bearing rotatably relative to the first pulley 50. On the end of the boss 111 on the same side as the large and small gears 54 and 64 are mounted, a large gear 112 having the same diameter as the large gear 54 of the first pulley 50 is mounted axially opposite to the small gear 64.

In the vicinity of the large gear 52 of the first pulley 50, the small gear 64 of the second pulley 60 and the large gear 112 of the ribbed pulley 110, a high speed ratio gear set 56 and a low speed ratio gear set 65 are disposed radially oppositely with the support shaft 113 interposed therebetween. The high speed ratio gear set 56 is constructed so that a small gear 58 in constant mesh with the large gear 54 of the first pulley 50 is coupled unitarily rotatably to a small gear 59 in constant mesh with the large gear 112 of the ribbed pulley 110. Furthermore, the high speed ratio gear set 56 is supported rotatably to an axial member 57 disposed parallel to the support shaft 113. With this construction, the ribbed pulley 110 can rotate at the same speed as the first pulley 50. As a result, the rotational shafts 131*b* to 131*d* of the engine accessories 130*b* to 130*d* are driven into rotation at the same speed ratio to the rpm of the engine 10 as ever. On the other hand, the low speed ratio gear set 65 is constructed so that a large gear 67 in constant mesh with the small gear 64 of the second pulley 60 is coupled unitarily rotatably to a small gear 68 in constant mesh with the large gear 112 of the ribbed pulley 110. Furthermore, the low speed ratio gear set 65 is supported rotatably to an axial member 66 disposed parallel to the support shaft 113. With this construction, the ribbed pulley 110 can rotate at a lower speed than the second pulley 60. As a result, the rotational shafts 131*b* to 131*d* of the engine accessories 130*b* to 130*d* are driven into rotation at a lower rpm than the rpm of the engine 10.

The drive system 20 also includes a speed ratio selector 80 as a belt shifter for shifting the flat belt 70 on the output pulley unit 40 from the first pulley 50 to second pulley 60 or vice versa. The speed ratio selector 80 has the same structure as in the first embodiment (see FIG. 2), whereby the tension pulley 85 oscillates between a high speed ratio position that shifts the flat pulley 70 to the first pulley 50 and a low speed ratio position that shifts the flat pulley 70 to the second pulley 60.

When the rpm of the engine 10 is low, a control unit 100 controls a drive unit 90 to allow the tension pulley 85 of the speed ratio selector 80 to tilt to the high speed ratio position to drive the rotational shafts 131*b* to 131*d* of the accessories 130*b* to 130*d* into rotation at a given rpm. On the other hand, when the rpm of the engine 10 is high, the control unit 100 controls the drive unit 90 to allow the tension pulley 85 to tilt to the low speed ratio position to drive the rotational shafts 131*b* to 131*d* of the accessories 130*b* to 130*d* into rotation at a lower speed ratio than that in the high speed ratio position.

Figure 9:
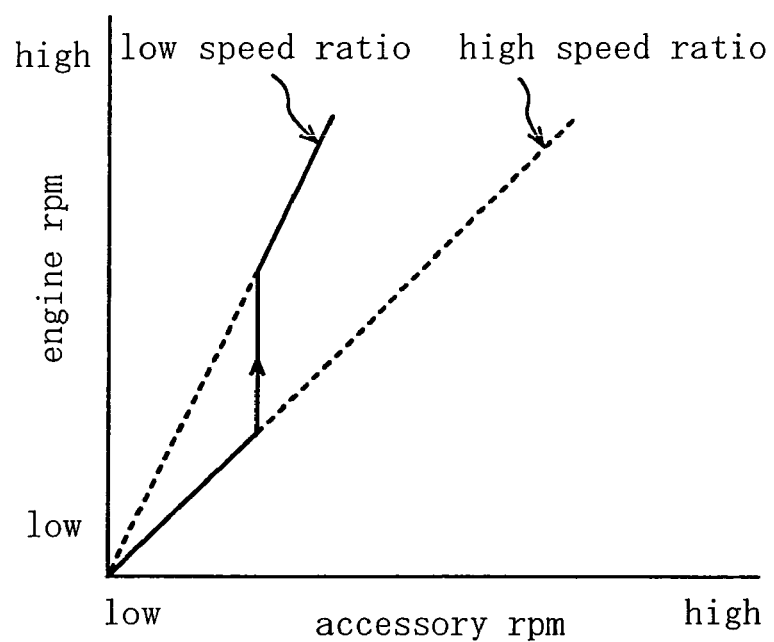
FIG. 9 is a corresponding plot to FIG. 3, showing the characteristic relationship between the rpm of an engine and the rpm of the rotational shaft of each engine accessory.
Figure 10:
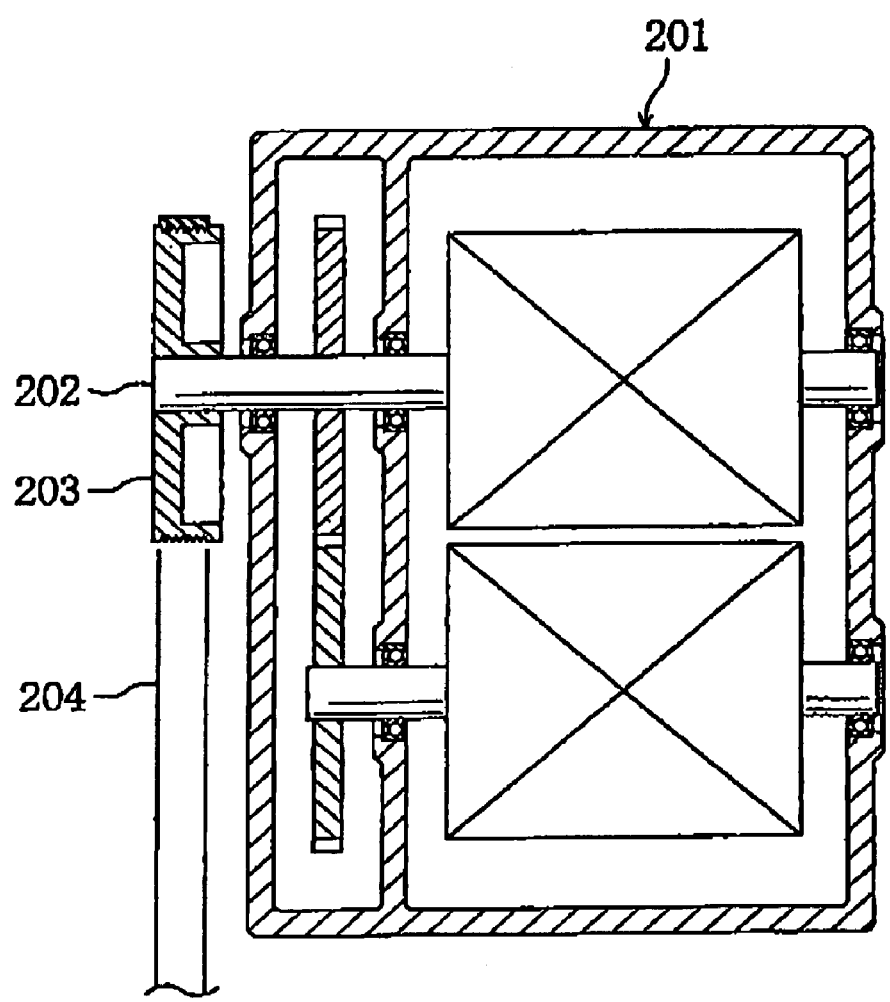
FIG. 10 is a cross-sectional view showing an essential part of a constant mesh type supercharger drive system.
Figure 11:
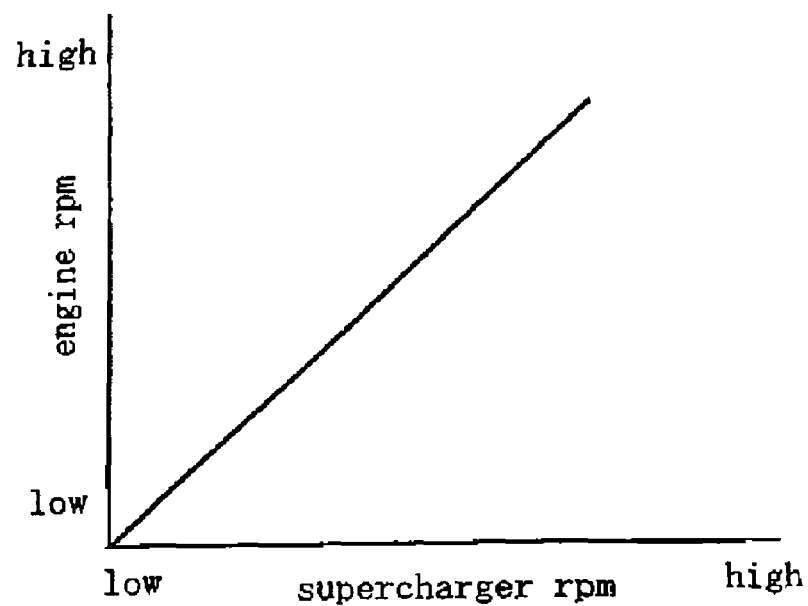
FIG. 11 is a corresponding plot to FIG. 3, showing the characteristic relationship between the rpm of an engine and the rpm of the rotational shaft of the supercharger in the constant mesh type supercharger drive system.

Next, the operation of the engine accessory drive system having the above structure will be described with reference to the characteristic diagram of FIG. 9. In this figure, the two lines passing through the origin indicate characteristics when the speed ratio selector 80 is switched to the high speed ratio position and the low speed ratio position, respectively.

When the rpm of the engine 100 is low, the control unit 100 controls the drive unit 90 to allow the tension pulley 85 of the speed ratio selector 80 to tilt to the high speed ratio position. Then, the flat belt 70 shifts from the second pulley 60 to the first pulley 50, and torque at the crankshaft 11 of the engine 10 is thereby transmitted through the crank pulley 30 and the flat belt 70 to the first pulley 50. As a result, the rotational shafts 131*b* to 131*d* of the accessories 130*b* to 130*d* are driven into rotation at the same rpm as ever. Therefore, the accessories 130*b* to 130*d* can bring out their boosting capabilities as ever.

Thereafter, when the rpm of the engine 10 becomes higher, the control unit 100 controls the drive unit 90 to allow the tension pulley 85 of the speed ratio selector 80 to tilt from the high speed ratio position to the low speed ratio position. Then, the flat belt 70 shifts from the first pulley 50 to the second pulley 60, and torque at the crankshaft 11 of the engine 10 is thereby transmitted through the crank pulley 30 and the flat belt 70 to the second pulley 60. As a result, the speed ratios of the rotational shafts 131*b* to 131*d* of the accessories 130*b* to 130*d* to the engine 10 become lower. Thereby, the loss in driving forces to be given to the accessories 130*b* to 130*d* becomes small.

As described above, in the automotive engine accessory drive system of this embodiment for transmitting torque at the crankshaft 11 of the vehicle engine 10 to the rotational shafts 131*b* to 131*d* of the plurality of accessories 130*b* to 130*d* in the serpentine belt drive system 120 to drive the accessories 130*b* to 130*d*, the flat belt 70 is entrained between the crank pulley 30 drivingly coupled to the crankshaft 11 and the output pulley unit 40 composed of the first pulley 50 and the second pulley 60 both coupled to the ribbed pulley 110 of the serpentine belt drive system 120. According to this embodiment, the flat belt 70 is shifted from the first pulley 50 to the second pulley 60 or vice versa by the speed ratio selector 80. As a result, the rotational shafts 131*b* to 131*d* of the accessories 130*b* to 130*d* can be driven into rotation with the switching between the speed ratio during low speed cruise and the speed ratio during high speed cruise, without any solenoid-operated clutch that would has conventionally been used.

Therefore, on the low speed cruise of the vehicle, the flat belt 70 is shifted to the first pulley 50 to bring out the capability of the accessories 130*b* to 130*d* as ever. On the other hand, on the high speed cruise of the vehicle, the flat belt 70 is shifted to the second pulley 60 to reduce the loss in the driving force to be given to the accessories 130*b* to 130*d*, without inducing increases in weight, cost and power consumption, and thereby suppress the deterioration of fuel economy of the vehicle engine.

In this embodiment, when the speed ratio selector 80 is in the high speed ratio position, the rotational shafts 131*b* to 131*d* of the accessories 130*b* to 130*d* are driven into rotation at the same rpm as ever. The speed ratios of the accessories to the engine, however, can be set individually depending upon the types, capacities or other conditions of the accessories.

Although this embodiment describes a drive system into which is incorporated a serpentine belt drive system 120 for driving a plurality of accessories 130*b* to 130*d* via a single power transmission belt, the present invention is also applicable to any engine accessory belt drive system not having such a serpentine belt drive system 120.

Although this embodiment describes the case where the accessories are a generator 130*b*, a power steering pump 130*c* and a compressor 130*d* for automotive air conditioner, the present invention is also applicable to other vehicle engine accessories.

INDUSTRIAL APPLICABILITY

As described above, the engine accessory belt drive system according to the present invention can reduce the loss in the driving force to be given to the accessories, without inducing increases in weight, cost and power consumption, and thereby suppress the deterioration of fuel economy. Therefore, it is suitable for an automotive engine and useful in the field of automotive vehicles.

What is claimed is:

1. An automotive engine accessory drive system in which torque at a crankshaft of an automotive engine is transmitted to a rotational shaft of an engine accessory to drive the engine accessory, the drive system comprising:
   an input-side pulley drivingly coupled to the crankshaft;
   an output-side pulley unit including a first flat pulley and a second flat pulley which are of substantially the same pulley diameter and disposed on the same axis and adjacent to each other, the first flat pulley being connectable to the rotational shaft of the engine accessory to drive the rotational shaft into rotation at a given speed ratio, the second flat pulley being connectable to the rotational shaft of the engine accessory to drive the rotational shaft into rotation at a lower speed ratio than that of the first flat pulley;
   a flat belt entrained between the input-side pulley and the output-side pulley unit to transmit torque at the input-side pulley to the output-side pulley unit; and
   a belt shifter for shifting the flat belt from the first flat pulley to the second flat pulley and vice versa.

2. An automotive engine accessory drive system in which torque at a crankshaft of an automotive engine is transmitted to a rotational shaft of an engine accessory to drive the engine accessory, the drive system comprising:
   an input-side pulley drivingly coupled to the crankshaft;
   an output-side pulley unit including a flat driving pulley and a flat drive disengagement pulley which are of substantially the same pulley diameter and disposed on the same axis and adjacent to each other, the flat driving pulley being connectable to the rotational shaft of the engine accessory to drive the rotational shaft into rotation, the flat drive disengagement pulley being rotatable independent of the rotational shaft of the engine accessory;
   a flat belt entrained between the input-side pulley and the output-side pulley unit to transmit torque at the input-side pulley to the output-side pulley unit; and
   a belt shifter for shifting the flat belt from the flat driving pulley to the flat drive disengagement pulley and vice versa.

* * * * *